United States Patent [19]

Salvio et al.

[11] Patent Number: 5,545,956
[45] Date of Patent: Aug. 13, 1996

[54] WINDOW WIPER SYSTEM FOR SMALL WINDOWS

[75] Inventors: Paul R. Salvio, Palos Verdes Estates; David M. Masarik, Laguna Beach; Kevin J. Wasserstein, Manhattan Beach, all of Calif.

[73] Assignee: Hughes Aircraft Company, Los Angeles, Calif.

[21] Appl. No.: 391,738

[22] Filed: Feb. 21, 1995

Related U.S. Application Data

[63] Continuation-in-part of Ser. No. 263,272, Jun. 21, 1994, Pat. No. 5,479,077.
[51] Int. Cl.⁶ .................................................. B60S 1/08
[52] U.S. Cl. .................... 318/283; 318/443; 318/DIG. 2; 318/484; 15/250.31
[58] Field of Search ................................ 318/256, 257, 318/258, 259, 261, 264, 280, 281, 282, 283, 284, 285, 293, 443, 444, 445, 452, 484, DIG. 2; 15/250.001, 250.12, 250.17, 250.2, 250.31, 250.32, 250.33, 250.34, 250.35

[56] References Cited

U.S. PATENT DOCUMENTS

| | | | |
|---|---|---|---|
| 4,336,482 | 6/1982 | Goertler et al. | 318/443 |
| 4,355,270 | 10/1982 | Cook et al. | 318/443 |
| 4,614,903 | 9/1986 | Betsch et al. | 318/443 |
| 4,663,575 | 5/1987 | Juzswik et al. | 318/444 |
| 5,086,260 | 2/1992 | Ito | 318/266 |

*Primary Examiner*—Bentsu Ro
*Attorney, Agent, or Firm*—Michael W. Sales; Wanda K. Denson-Low

[57] ABSTRACT

A motor drive system for imparting oscillating motion to a window wiper is disclosed which slows the wiper as it approaches respective right and left positions and holds the wiper at the right and left positions for a selectable delay interval in order to avoid deleterious effects of instantaneous motor direction reversal. The system includes a motor drive chip for generating the drive signal to the window wiper motor, a programmable logic array for sequencing the operation of the motor drive chip, and a delay chip for timing the selected delay.

10 Claims, 4 Drawing Sheets

WINDOW WIPER SYSTEM FOR SMALL WINDOWS

This application is a continuation-in-part of U.S. Ser. No. 08/263,272, filed on Jun. 21, 1994, now U.S. Pat. No. 5,479,077, issued Dec. 26, 1995.

BACKGROUND OF THE INVENTION

1. Field of the Invention

The subject invention relates to window wiper systems and, more particularly, to apparatus for controlling the motion of a motor-driven wiper blade used in such systems.

2. Description of Related Art

Thermal vision systems capable of producing real time video pictures in total darkness have recently been introduced for civilian use, most particularly for law enforcement agencies. Such systems work much like the forward-looking infrared technology used by the U.S. military. Current Night Vision System designs depend on clear infrared vision through an edge-heated sensor window mounted flush with a housing.

Surface quality of such a detector window must be maintained by keeping the surface free of rain and snow. Conventional "window wiper" designs for windshields are large and heavy and controlled by complex mechanical means, and are unsuitable for the compact environment of a Night Vision infrared sensor. Designs for other smaller surfaces, such as head lamps, are equally complex.

In copending application Ser. No. 08/263,272, a streamlined, small scale window wiper is disclosed which is ideally suited to remove foreign particles from an infrared detector window and thus maintain image quality during adverse environmental conditions. The wiper includes a wiper hub, wiper arm, wiper blade holder, and torsion spring means. Means for controlling the window wiper oscillating motion across the thermal imaging window is also provided. In one embodiment, such control is achieved through the incorporation of a suitable motor, Hall effect sensors, and an activating magnet. In a second embodiment, such control is achieved through the incorporation of a motor, LED sensors, and a solid disk interrupt.

In such a system, the inventors have found that problems arise when the motor which drives the wiper blade reverses direction. Electrically, a voltage spike is generated, which creates electrical wear and tear and may damage motor windings and reduce motor life. Mechanically, a backlash is created when direction is instantaneously reversed, which can stress and ultimately break gear teeth.

OBJECTS AND SUMMARY OF THE INVENTION

It is thus an object of the invention to improve miniaturized window wipers, as well as systems for actuating the same;

It is another object of the invention to provide a device for cleaning and clearing the sensor window of a Night Vision infrared imaging device;

It is another object to provide such a device which is compact, lightweight, has a low part count, and is easily manufactured; and It is still another object to eliminate the adverse affects of instantaneous motor reversal in motor-driven window wiper systems.

According to the invention, control circuitry is provided which causes the wiper blade motor to pause for a selected period of time prior to reversing direction. The pause eliminates the adverse electrical and mechanical effects attendant to substantially instantaneous motor reversal.

BRIEF DESCRIPTION OF THE DRAWINGS

The just-summarized invention will now be described in connection with the drawings of which.

DETAILED DESCRIPTION OF THE PREFERRED EMBODIMENTS

Figure 1:
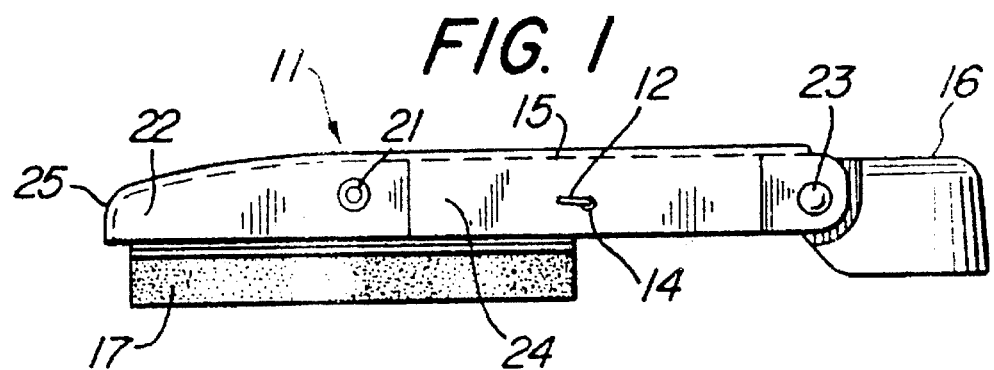
FIG. 1 is a side elevational view of a miniaturized window wiper embodiment.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a particularly useful and readily manufacturable window wiper system and control circuitry therefor.

The preferred window wiper 11 is illustrated in FIGS. 1–5. This window wiper 11 includes a wiper hub 16 pivotally mounted by a first wiper pin 23 to a wiper arm 15. The wiper arm 15 is, in turn, pivotally mounted by a second wiper pin 21 to a wiper blade holder 13. The wiper blade holder 13 mounts the wiper blade 17, for example, in slidably inserted fashion. The respective first and second wiper pins 21, 23 may be held in position by fasteners at either end thereof, for example, such as rivets or so-called "E-clips."

Figure 2:
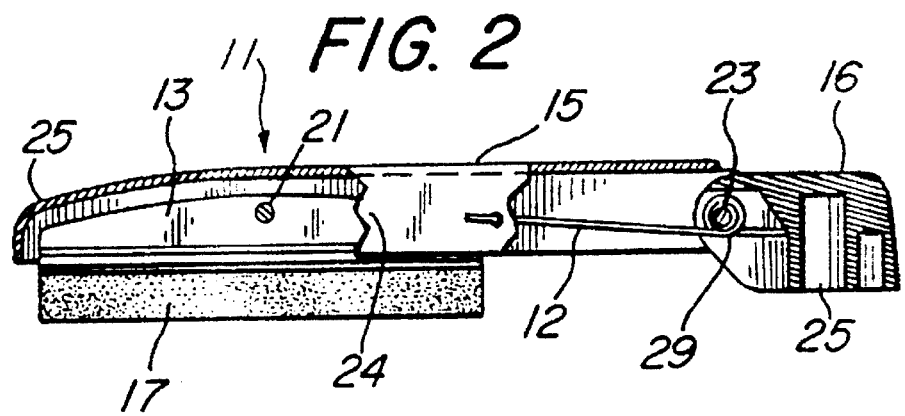
FIG. 2 is a partially broken away side view of the window wiper of FIG. 1.
Figure 3:
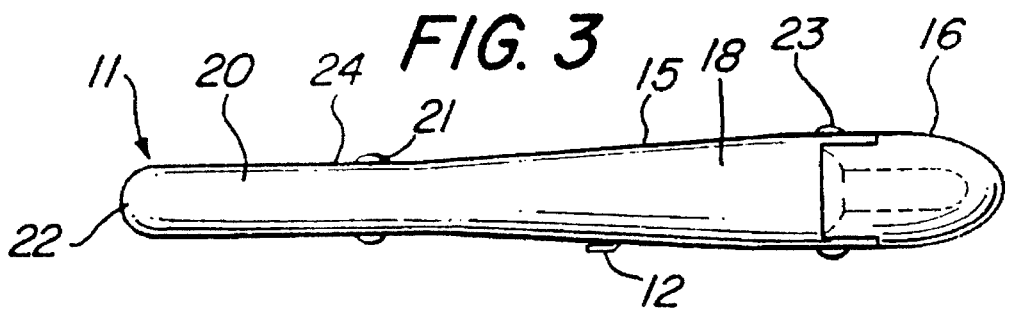
FIG. 3 is a top view of the window wiper of FIG. 1.
Figure 5:
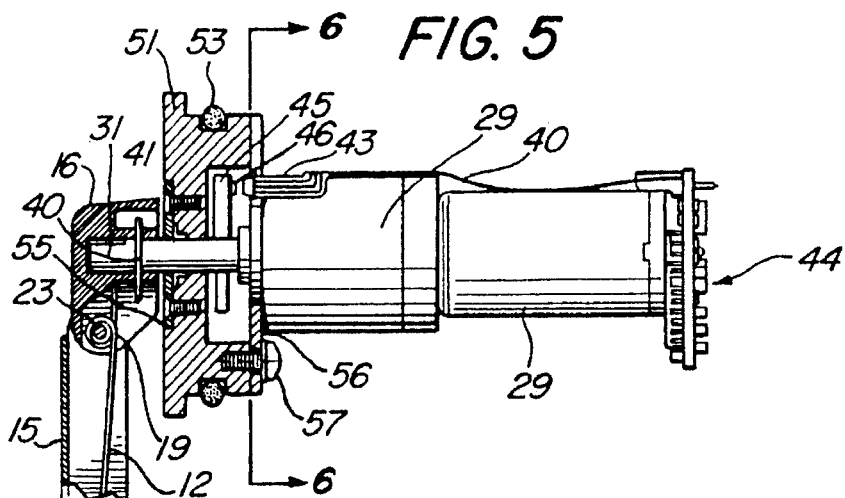
FIG. 5 is a side sectional view of the window wiper of FIG. 1 and a motor assembly for driving it.

As shown in FIG. 2, the hub 16 includes a concealed boss 30 containing a central bore 25 for attachment to the drive shaft of a motor, e.g., 29 (FIG. 5). The bore 25 is generally cylindrical in cross-section with the exception of a flat face 26 which provides for positive interlocking with a motor drive shaft.

A torsion spring 19 is located on the wiper pin 23 in order to provide a downward force on the wiper arm 15, biasing the wiper arm 15 toward the window. A first extended arm 12 of the spring 19 is shaped to interlock with an aperture 14 in the side of the wiper arm 15.

The wiper arm 15 is shaped to provide a shroud over the wiper blade holder 13 and the torsion spring 19, thereby contributing to an aesthetic overall appearance. Thus, as seen in the top view of FIG. 3, the shroud contains a first rear portion 18 whose sides sweep symmetrically over half its length into an elongated front portion 20 terminating in a rounded nose 22. In the side view of FIG. 1, the wiper arm 15 exhibits a depending side skirt 24 terminating in a linear edge 35, as well as a downward slope 27 to the nose 22.

Figure 4:
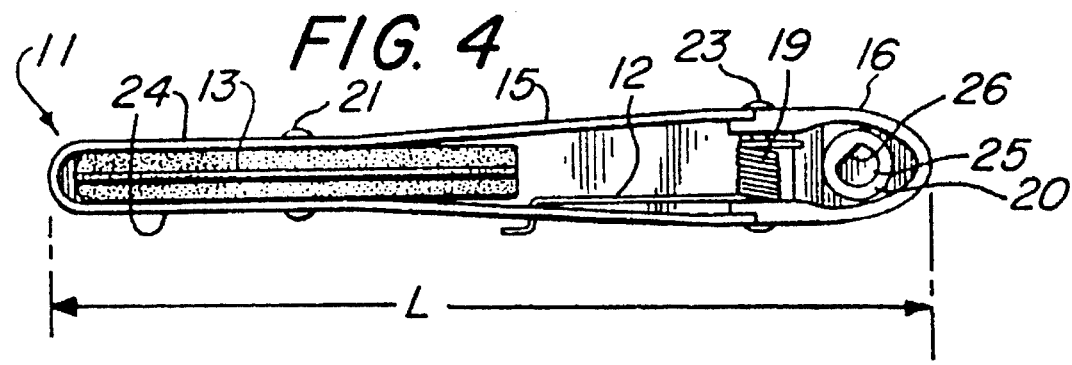
FIG. 4 is a bottom view of the window wiper of FIG. 1.

In one exemplary embodiment, the wiper hub 16, wiper arm 15, and wiper blade holder 13 are made of high-impact polystyrene. The torsion spring 19 supplies a downward force on the wiper blade 17 of approximately 3.2 oz. Dimension L in FIG. 4 is approximately N=3.939 inches.

Figure 6:
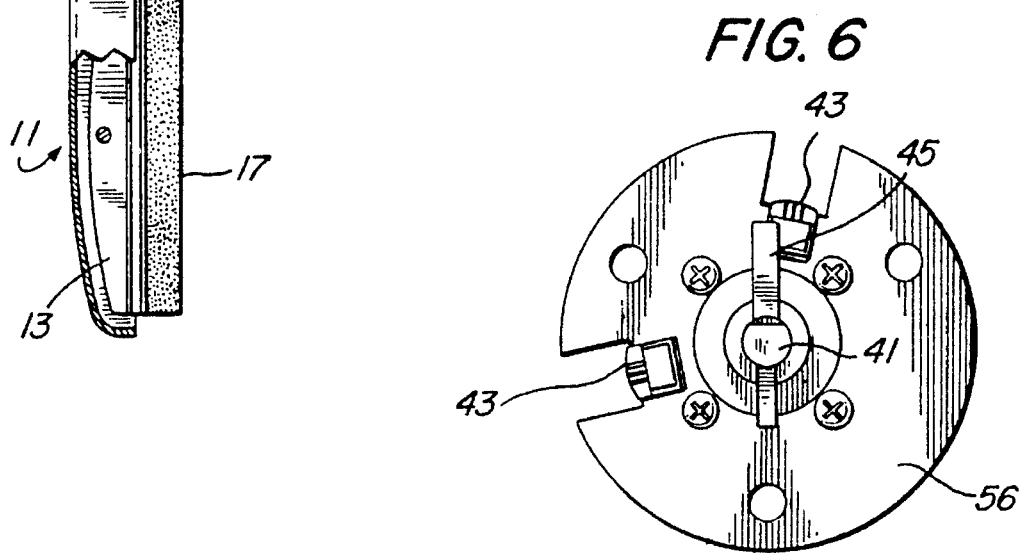
FIG. 6 is a sectional view taken at 6—6 of FIG. 5.

FIGS. 5 and 6 illustrate a wiper motor assembly employing magnetic means to control the oscillation of the wiper 11 of FIGS. 1–4. In FIGS. 5 and 6, a motor 29 is mounted in conjunction with a cooperating housing by means of a motor bracket 51 and O-ring seal 53. A circular retainer seal 55 is fitted over the motor shaft 41 and screwed or otherwise fastened into position on the motor bracket 51. A switch plate 56 carrying first and second Hall effect sensors 43 is attached to the face of the motor 29, again by suitable screws or other fastening means. The motor bracket 51 is then attached to the switch plate 56 by a screw or similar fastener 57. The hub 16 of the wiper 11 may be attached to the motor shaft 41 by any conventional means such as set screws, splines, screw-type or retaining rings or clips. A retaining ring 40 is shown in use in FIG. 5. The motor may be a reversible 12-volt DC gear head motor.

In the embodiment of FIGS. 5 and 6, the motor 29 is controlled by the first and second Hall effect sensors 43. A magnetic activator or magnetic pin 45 has a magnetic element 46 (FIG. 5) attached thereto and is positioned to rotate with the motor shaft 41 and thereby actuate the sensors 43. The sensors 43 may be part No. 4140U as available from Allegro and connected by a suitable flex cable 31 to cooperating switching electronics 44 which accomplish directional switching.

Thus, in overall operation of the embodiment of FIGS. 5 and 6, Hall effect sensor-magnetic activator interaction is used to generate control signals for controlling oscillatory motion of the wiper 11. The motor 29 initiates motion of both the wiper 11 and the magnetic activator 45. The magnetic activator 45 approaches the Hall effect sensor 43 on one side of the motor 29 and activates it. Wiper blade direction is then reversed, which subsequently results in activation of the second magnetic sensor. Two governor pins (not shown) may also preferably be provided, spaced 120 degrees apart. Such pins may serve as physical stops for the magnetic pin in order to physically stop wiper movement should the magnetic means fail.

Figure 8:
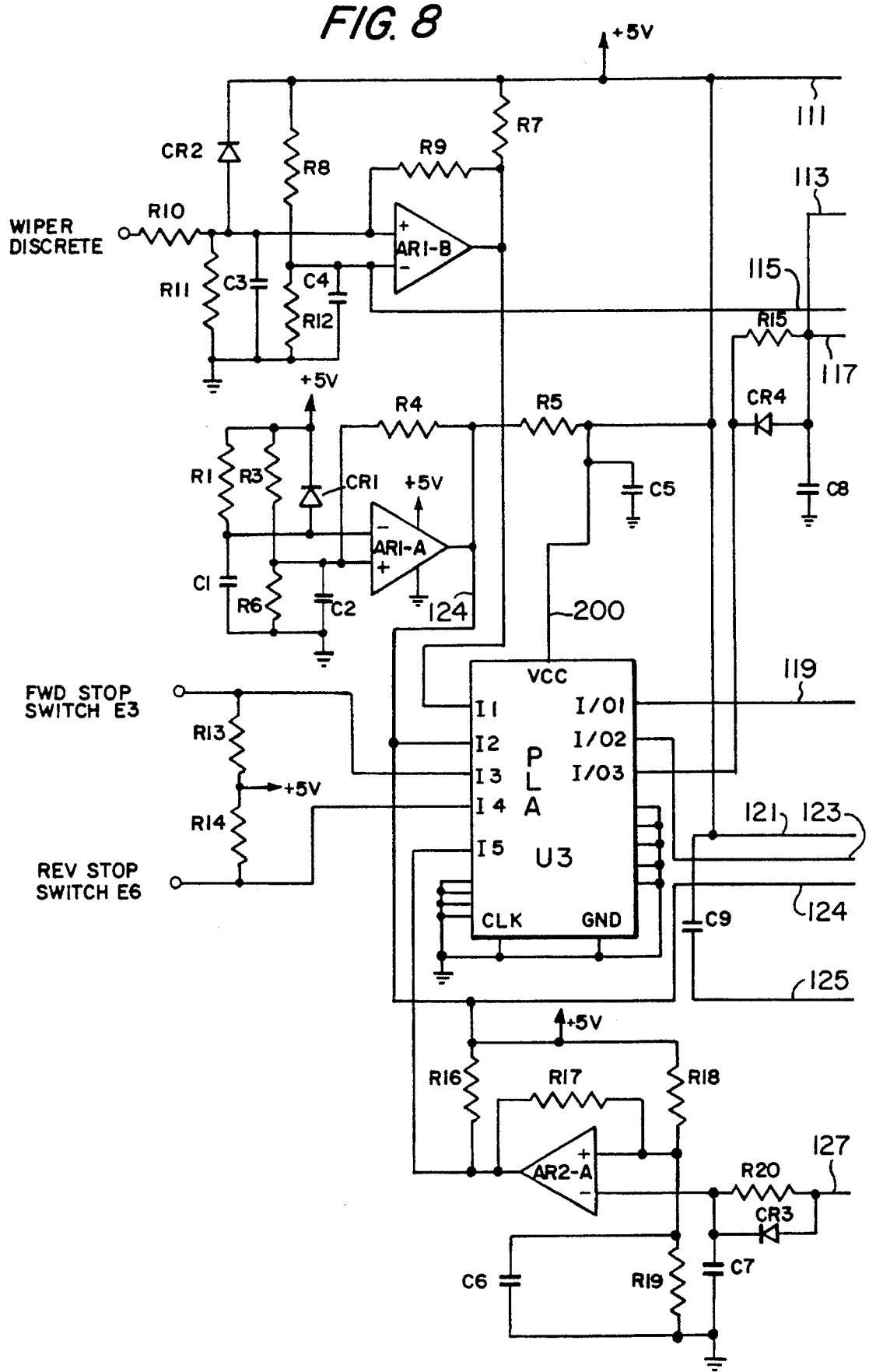
FIGS. 8 and 9 comprise an electrical circuit diagram of electronic motor control circuitry according to the preferred embodiment.
Figure 9:
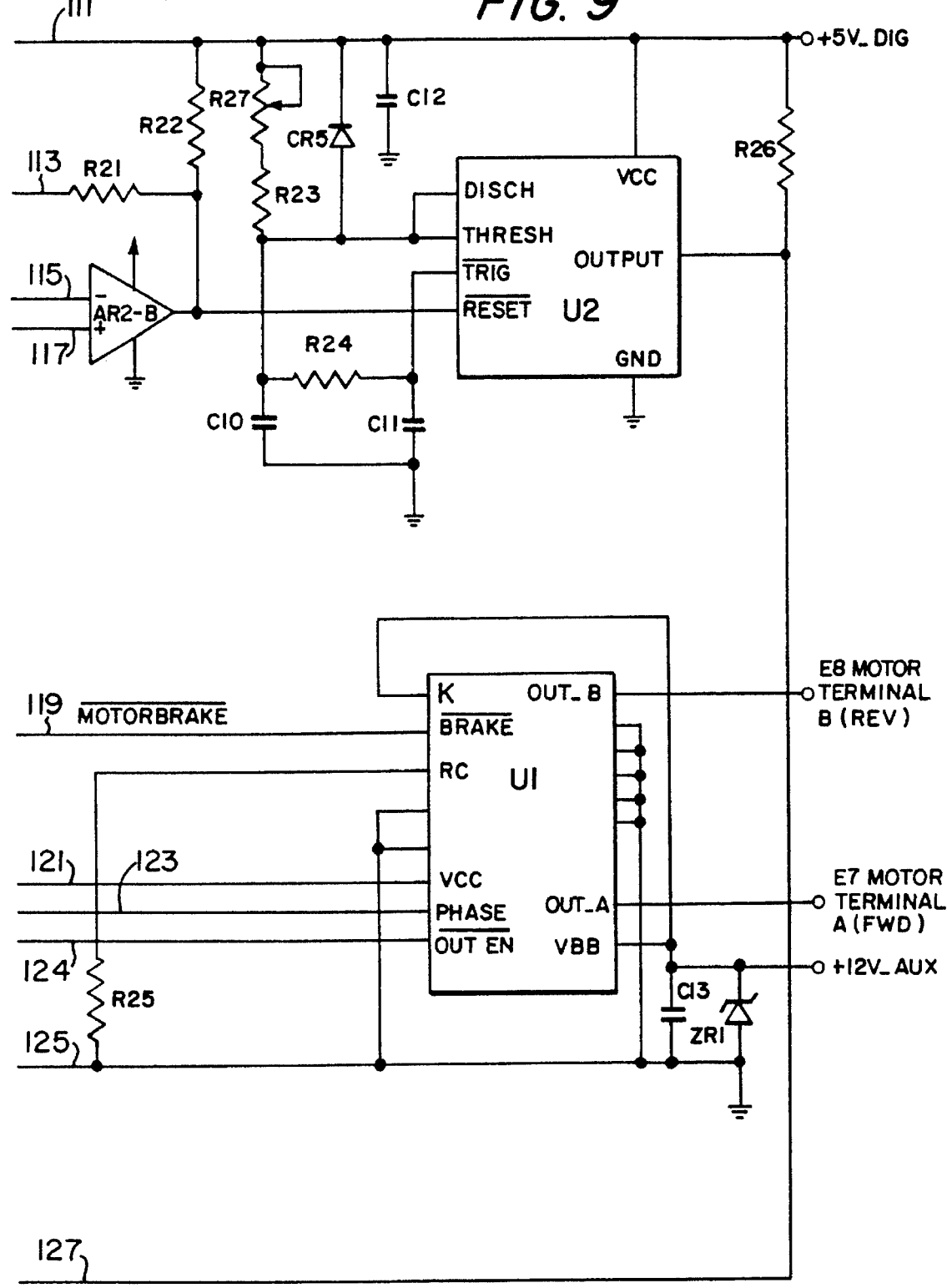

The precise motion of the wiper blade 11 according to the preferred embodiment is controlled by the motor control circuitry shown in FIGS. 8 and 9. This circuitry is responsive to three input signals: a "wiper discrete" signal, a forward stop switch signal FWD STOP, and a reverse stop switch signal REV STOP. The forward stop switch signal FWD STOP is produced by a first of the Hall effect sensors, while the reverse stop switch signal REV STOP is produced by the other Hall effect sensor. The wiper discrete signal signals the circuit to begin normal oscillatory motion of the wiper 11.

The primary elements of the circuit of FIGS. 8 and 9 are a programmable logic array (PLA) $U_3$, a motor driver chip $U_1$, and a delay chip $U_2$, the latter two components being shown in FIG. 9. The motor driver chip $U_1$ has output terminals OUT A and OUT B connected directly to the terminals of the motor 29 for controlling motor operation. The PLA $U_3$ supplies control signals to the motor driver chip $U_1$ to cause reversal of motor direction, slowing of motor speed, and a time delay prior to actuation of motor reversal. The time delay is implemented by the delay chip $U_2$. The PLA $U_3$ and chips $U_1$ and $U_2$ in the illustrative embodiment of FIGS. 8 and 9 are conventional off-the-shelf chips, respectively comprising PALCE16V8, UDN2953LB, and LMC555 integrated circuits.

The circuitry of FIGS. 8 and 9 further includes three comparator amplifiers AR1-A, AR1-B, and AR2-B, as well as a buffer amplifier AR2-A. Each of these amplifiers may comprise LM2903 amplifier circuits. The first comparator AR1-A is employed in setting initial conditions of the circuit, while the second and third comparators AR1-B and AR2-B provide noise immunity to prevent false triggers in operation of the circuitry, as hereafter described in more detail. Amplifier AR2-A buffers the output of the delay chip $U_2$ into the PLA $U_3$.

Considering the structure and interconnection of the circuitry of FIG. 8 in more detail, first circuitry including the first comparator AR1-A is provided to set the initial operating conditions of the circuit. Accordingly, the output of the comparator amplifier AR1-A is connected over a signal line 124 to the $\overline{\text{OUT EN}}$ input of the motor driver chip $U_1$. The output of the comparator AR1-A is further connected through a resistor R5 to a +5-volt supply voltage line 111. A feedback resistor R4 is connected between the noninverting input and the output of the first comparator AR1-A.

The noninverting input of the comparator AR1-A is further connected to ground through a capacitor C2 and to the junction of a voltage divider formed by two resistors R3 and R6 connected between the +5-volt supply and ground. The inverting input of the first amplifier AR1-A is connected to the anode of a diode CR1 whose cathode is connected to the +5-volt supply line 111, to one terminal of a capacitor C1 whose second terminal is grounded, and to one terminal of a resistor R1 connected in parallel across the diode CR1.

The "wiper discrete" signal, which activates wiper operation, is supplied on a first input through a series resistor R10 to the noninverting input of the second comparator amplifier AR1-B. The noninverting input of the second amplifier AR1-B is further connected to ground through the parallel combination of a resistor R11 and a capacitor C3 and to the anode of a diode CR2 whose cathode is connected to the +5-volt supply voltage line 111. The inverting input of the second amplifier AR1-B is connected to the junction of a resistor R8 and a resistor R12, which pair of resistors R8, R12 form a voltage divider between ground and the +5-volt supply line 111.

A feedback resistor R9 is further connected between the noninverting input and the output of the amplifier AR1-B. The output of the amplifier AR1-B is also connected through a resistor R7 to the +5-volt supply line 111 and to a first input I1 of the PLA $U_3$. The circuit including the comparator AR1-B is implemented to provide noise immunity in the transfer of the "wiper discrete" signal to the programmable logic array $U_3$ such that the potential for false triggering of the wiper operation is eliminated.

The voltage at the inverting input to the second comparator amplifier AR1-B is applied over signal line 115 to the inverting input of the third noise immunity comparator amplifier AR2-B (FIG. 9). The output of the comparator AR2-B is connected to the reset input of the delay chip $U_2$. The noninverting input of the comparator AR2-B is connected over signal line 117 to one terminal of a resistor R15 whose second terminal is connected to the third output I/O3 of the PLA $U_3$. A diode CR4 is connected across the resistor R15, with its anode connected to the noninverting input of the comparator AR2-B and to a first terminal of a capacitor C8, the second terminal of capacitor C8 being grounded. A feedback resistor R21 has a first terminal connected over a signal line 113 to the noninverting input 117 of the amplifier AR2-B and a second terminal connected to the output of the amplifier AR2-B. A resistor R22 further connects the +5-volt supply line 111 to the output of the comparator AR2-B. The circuitry including the second comparator AR2-B is provided to again provide noise immunity such that false triggering of the reset input of the delay chip $U_2$ is prevented.

The programmable logic array $U_3$ receives the forward stop switch signal FWD STOP and the reverse stop switch signal REV STOP at its respective third and fourth inputs I3, I4. The VCC input of the PLA $U_3$ is connected to the +5-volt supply voltage by a signal line 200 which is connected to a grounded capacitor C5. The PLA $U_3$ provides a motor brake control signal $\overline{\text{MOTOR BRAKE}}$ on its first output I/O1 and over signal line 119 to the $\overline{\text{BRAKE}}$ input of the motor driver chip $U_1$ and a phase control signal on its second output I/O2 and over a signal line 123 to the PHASE input of the motor driver chip $U_1$. The unused inputs and outputs of the PLA $U_3$ are grounded.

As noted above, the motor driver chip $U_1$ provides signals for controlling the operation of the motor 29 which is connected across terminals E7 and E8, which are, in turn, connected to the OUT A and OUT B outputs of the motor driver chip $U_1$. The K input of the motor driver chip $U_1$ is connected through a capacitor C13 to ground, while the RC input is connected through a resistor R25 to ground. The VBB output of the motor driver chip $U_1$, as well as the ungrounded terminal of the capacitor C13 and the cathode of a zener diode ZR1, are connected to a +12-volt auxiliary voltage, such as an automobile battery voltage. A signal line 121 connects the VCC terminal of the motor driver chip $U_1$ to the +5-volt supply. The unused terminals of the motor driver chip $U_1$ are grounded to a ground line 125.

The delay circuit including the delay chip $U_2$ (FIG. 9) is used to time the periods during which the motor is turned off prior to reversing direction. The period may be set, for example, in the range of ½ to 10 seconds. The circuitry includes a delay period setting variable resistor R27 connected between the +5-volt supply line 111 and the first terminal of a resistor R23, whose second terminal is connected in common to the discharge DISCH and threshold THRESH inputs of the delay chip $U_2$. These inputs DISCH and THRESH are further connected to the anode of a diode CR5 whose cathode is connected to the +5-volt supply line 111.

The second terminal of the resistor R23 is connected to a network connected to the $\overline{\text{TRIG}}$ input of the delay chip $U_2$. The network includes a resistor R24 connected between the second terminal of the resistor R23 and the $\overline{\text{TRIG}}$ input and having respective terminals connected through respective capacitors C10, C11 to ground.

The output of the delay chip $U_2$ is connected through a resistor R26 to the +5-volt supply level and over a signal line 127 to one terminal of a resistor R20 whose other terminal is connected to the inverting input of the buffer amplifier AR2-A. The output of the buffer amplifier AR2-A is connected to the fifth input 15 of the PLA $U_3$, and essentially comprises a "WHICH WAY TO GO" signal to the PLA $U_3$, causing the PLA $U_3$ to toggle the motor driver chip $U_1$ between the reverse and forward directions of wiper drive. The buffer amplifier circuit further includes a feedback resistor R17 connected between the noninverting input and the output of the amplifier AR2-A. First and second resistors R18 and R16 are connected, respectively, from the input and the output of the amplifier AR2-A to the +5-volt supply. A diode CR3 is further connected across the resistor R20 and has its cathode connected to the first terminal of a capacitor C7 whose second terminal is grounded. Finally, the noninverting input of the amplifier AR2-A is connected to the parallel combination of a capacitor C6 and resistor R19 whose second terminals are grounded.

The operation of the circuitry of FIGS. 8 and 9 will now be described in more detail. As noted, the comparator AR1-A provides a power-up reset function. Thus, when the vehicle is turned on, the 5-volt supply is applied, and the output of the comparator AR1-A serves to reset the wiper 11 so that it goes to the forward position. Essentially, this defines an initial condition, a state called "park," wherein the wiper 11 waits for a "wiper discrete" command to begin normal operation.

More particularly, with the I1 input of the PLA at a logic "0," when the output of the first amplifier AR1-A goes positive (logic "1"), a positive logic level is supplied to input terminal 12 of the PLA and to the $\overline{\text{OUT}}$ $\overline{\text{EN}}$ input of the motor driver chip $U_1$. The PLA $U_3$, in turn, provides an appropriate logic level to the PHASE input of the enabled motor driver chip $U_1$ which, in turn, causes the wiper 11 to be driven toward the forward position. When the forward stop switch E3 is activated, the PLA $U_3$ provides the motor brake signal to the $\overline{\text{BRAKE}}$ input of the motor driver chip, causing the motor driver chip $U_1$ to slow or brake the operation of the motor 29, thereby bringing the wiper blade 17 to a gradual halt at its "forward" position. The circuit is then in the "park" state, awaiting the application of a wiper discrete signal to the input of the second comparator amplifier AR1-B.

Application of the wiper discrete signal causes a positive logic level (logic "1") to be applied to the I1 input of the PLA $U_3$. In response, the PLA $U_3$ changes the state of the PHASE input to the motor driver chip $U_1$, which causes the motor driver chip $U_1$ to drive the wiper 11 in the reverse direction. When the reverse stop switch is passed, and the reverse stop signal REV STOP is produced, the PLA $U_3$ provides the "motor brake" signal to the motor driver chip $U_1$, causing the wiper 11 to slow down and come to rest in the reverse position.

The PLA $U_3$ times the motor brake interval, and at the end thereof, provides a signal on its output I/O3 which, in turn, causes the third amplifier AR2-B to activate the RESET input to the delay chip $U_2$. After the delay interval selected by the setting of variable resistor R27 passes, the delay chip $U_2$ provides an output to the buffer amplifier AR2-A which, in turn, provides a positive logic level to the fifth input 15 of the PLA $U_3$. In response, the PLA $U_3$ again changes the logic state of the signal supplied to the PHASE input of the motor driver chip $U_1$, whereupon the motor driver chip $U_1$ begins to drive the wiper 11 in the forward direction towards the forward stop switch. When the wiper 11 reaches the forward stop switch, the PLA $U_3$ again supplies the "motor brake" signal to slow the wiper 11 into the forward rest position and, thereafter, supplies a signal on its third output I/O3 to the third amplifier AR2-B to again activate the delay chip $U_2$ to time a delay interval. After the timed delay, the PLA $U_3$ again changes the logic state supplied to the motor driver chip $U_1$ to again cause the wiper 11 to begin moving in the reverse direction.

Specific component values for the illustrative embodiment of FIGS. 8 and 9 with resistances in ohms are:

| | | |
|---|---|---|
| R1 - 1M ± 1% | R16 - 2.49K ± 1% | C2 - .01 μF ± 10% |
| R3 - 10K ± 1% | R17 - 10K ± 1% | C3 - .1 uF ± 10% |
| R4 - 10K ± 1% | R18 - 10K ± 1% | C4 - .01 ± 10% |
| R5 - 10K ± 1% | R19 - 10K ± 1% | C5 - .1 uF ± 10% |
| R6 - 10K ± 1% | R20 - 464K ± 1 % | C6 - .01 ± 10 F |
| R7 - 2.49K ± 1% | R21 - 1M ± 1% | C7 - .1 uF ± 10% |
| R8 - 10K ± 1% | R22 - 2.49K ± 1% | C8 - .1 uF ± 10% |
| R9 - 1M ± 1% | R23 - 10K ± 1% | C9 - .1 uF ± 10% |
| R10 - 499K ± 1% | R24 - 5M ± 5% | C10 - 47 uF ± 10% |
| R11 - 499K ± 1% | R25 - 30.1K ± 1% | C11 - .1 uF ± 10% |
| R13 - 10K ± 1% | R26 - 10K ± 1% | C12 - .1 uF ± 10 F |
| R14 - 10K ± 1% | R27 - 200K | C13 - .1 uF ± 10% |
| R15 - 499K ± 1% | C1 - .1 uF ± 10% | |

Figure 7:
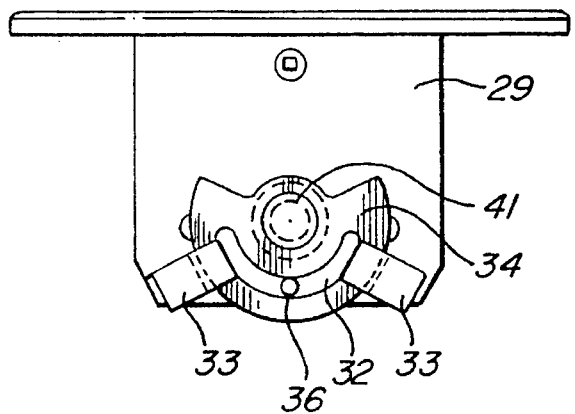
FIG. 7 is a front view illustrating alternate apparatus for imparting oscillatory motion to the preferred window wiper of FIG. 1.

An alternate embodiment may employ optical means to supply the forward and reverse stop switch signals FWD STOP, REV STOP, as illustrated in FIG. 7. In particular, slotted optical switches 33 are provided on either side of the motor 29. As shown in FIG. 6, these switches 33 may be positioned at equal angles from the vertical, i.e., symmetrically disposed on either side of the motor 29. The switches may be LED sensor switches part No. OPB848Tx as available from OPTEK. A solid disk interrupt 34 having a circular slot 32 therein is fixedly attached to and moves with the motor shaft 41.

In the embodiment of FIG. 7, the range of oscillatory motion of the wiper 11 attached to the drive shaft 41 is controlled in response to the interaction of the LED sensor switches 33 and the solid disk interrupt 34. The motor 29 initiates both the motion of the wiper 11 and the solid disk 34. Throughout the permitted range of motion, the LED sensor 33 is prevented from "seeing itself." As a result of the solid disk interrupt, when the limit of motion is reached, a sensor 33 does see itself, causing generation of a switching signal and ultimate reversal of the direction of the rotation of the motor shaft 41. This reversal is again repeated ad infinitum. In the embodiment of FIG. 7, a governor pin 36 is provided to physically limit the range of motion of the wiper blade 11 in the event of failure of the optical motion limiting means.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A window wiper system for the window of an infrared camera comprising:
   a motor means having a shaft and responsive to an electrical drive signal to rotate said shaft;
   a wiper having one end coupled to said shaft, said wiper having:
      a wiper hub,
      a wiper arm pivotally mounted to said hub, said wiper arm including a unitarily formed member having a top surface sweeping inwardly over half its length into an elongated front portion terminating in a rounded nose and having respective side skirts depending from said top surface, said side skirts each terminating in a linear edge,
      a wiper blade holder pivotally mounted to said wiper arm,
      a wiper blade mounted to said holder, and
      torsion spring means applying downward force on said wiper arm to press said blade against said window; and
   means for controlling the drive signal to said motor means such that said wiper moves in an oscillatory motion across said window between a first position and a second position, said means for controlling further causing said motor means to stop the motion of said wiper for a selected period of time at said second position before causing said wiper to move toward said first position, and for causing said motor means to stop the motion of said wiper for a selected period of time at said first position before causing said wiper to move toward said second position.

2. The system of claim 1 wherein said means for controlling said drive signal includes magnetic means for sensing the position of said shaft and generating control signals indicative thereof.

3. The system of claim 2 wherein said magnetic means comprises first and second Hall effect sensors disposed about said shaft and a magnetic activator fixedly mounted to said shaft.

4. The system of claim 1 wherein said means for controlling said drive signal further decreases the magnitude of the drive signal applied to said motor means as said wiper approaches each of said first and second positions, thereby slowing movement of said wiper as said first and second positions are approached.

5. The system of claim 4 wherein said means for controlling includes:
   a motor driver circuit means for generating the drive signal applied to said motor means; and
   means including a programmable logic array for supplying control signals for controlling operation of said motor drive circuit means.

6. The system of claim 5 further including:
   delay circuit means for supplying a control signal to said programmable logic array; and
   means for supplying a control signal to said delay circuit means in response to an output signal generated by said programmable logic array.

7. The system of claim 1 wherein said means for controlling includes:
   a motor driver circuit means for generating the drive signal applied to said motor means; and
   means including a programmable logic array for supplying control signals for controlling operation of said motor drive circuit means.

8. The system of claim 7 further including:
   delay circuit means for applying a control signal to said programmable logic array; and
   means for supplying a control signal to said delay circuit means in response to an output signal generated by said programmable logic array.

9. The system of claim 8 wherein said means for controlling said drive signal includes magnetic means for sensing the position of said shaft and generating control signals indicative thereof.

10. The system of claim 9 wherein said magnetic means comprises first and second Hall effect sensors disposed about said shaft and a magnetic activator fixedly mounted to said shaft.

\* \* \* \* \*